Patented Dec. 5, 1922.

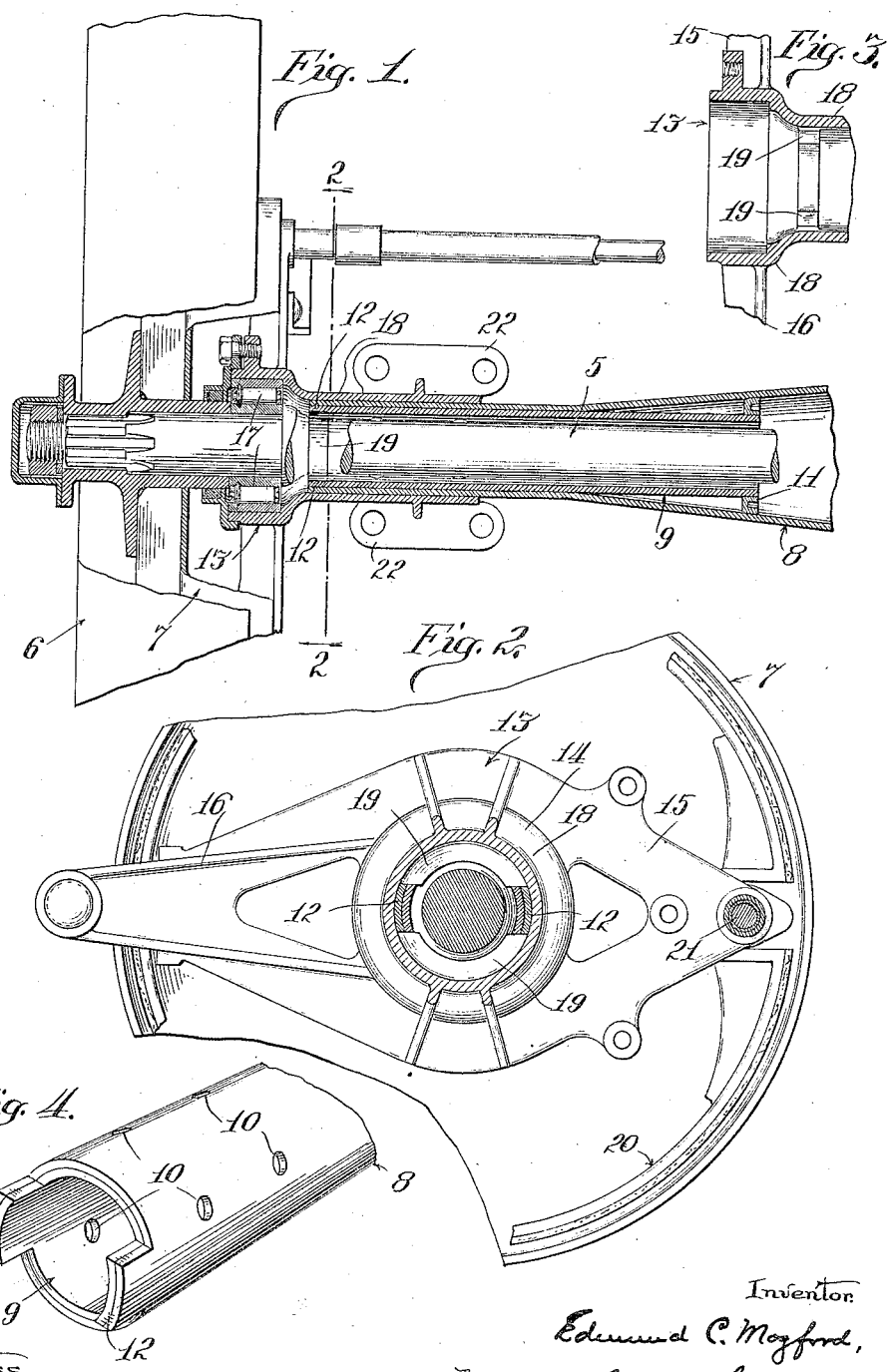

1,437,474

UNITED STATES PATENT OFFICE.

EDMUND C. MOGFORD, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR VEHICLES.

Application filed March 9, 1922. Serial No. 542,295.

*To all whom it may concern:*

Be it known that I, EDMUND C. MOGFORD, a citizen of the United States, and a resident of Buchanan, in the county of Berrien and State of Michigan, have invented certain new and useful Improvements in Axles for Motor Vehicles, of which the following is a specification, reference being had to the accompanying drawings.

My invention relates to axles, and has to do particularly with rear axles for motor vehicles such as trucks in which the rear wheels are driven from the rear axle and are provided with brake drums adapted to cooperate with brakes supported by and connected with the axle. In vehicles of this description the rear axle is usually enclosed in a housing, which also encloses the differential gearing through which the rear axle is driven from the motor, and the brakes are supported by brackets secured to the outer end portions of the housing, and the object of my invention is to provide certain improvements in axles of this description by which the brake supporting brackets may be better secured to the housing so that they will be capable of withstanding the strains to which they are subjected without danger of becoming disconnected or loosened. I accomplish this object as illustrated in the drawings and hereinafter described. What I regard as new is set forth in the claims.

In the drawings,—

Fig. 1 is a partial plan view of a wheel and axle embodying my invention, some parts being in section;

Fig. 2 is a partial sectional view on line 2—2 of Fig. 1;

Fig. 3 is a partial longitudinal sectional view of the central portion of one of the brake supporting brackets; and Fig. 4 is a partial perspective view of the outer end portion of the axle housing.

As both end portions of the axle are alike, I have illustrated and described only one end portion thereof. In the drawings, 5 indicates the axle, the inner end portion of which is connected with the usual differential gearing, and the outer end portion of which is connected with one of the vehicle wheels 6 in such manner that rotation of the axle causes the wheel to rotate. As shown in Fig. 1, the wheel is provided with the usual brake drum 7 at its inner side, and this may be mounted in any suitable way on the wheel. The axle 5 extends through a tubular housing 8, the central portion of which is connected with the usual differential housing, and the outer end portion of said housing is provided with an internal sleeve 9 which is fixedly secured thereto, preferably by rivets passing through rivet holes 10 shown in Fig. 4. As best shown in Fig. 1 the intermediate portion of the housing is tapered, but the sleeve 9 is preferably of uniform diameter throughout, its inner end portion being supported and braced by a collar 11 which is fitted tightly between it and the tapered inner face of the housing 8 as shown in Fig. 1. The outer end of the sleeve 9 is flush with the outer end of the housing 8, as shown in Figs. 1 and 4, and these ends are cut back to form tenons 12 which project from the outer ends of the said members as shown in Fig. 4 forming a clutch member, the purpose of which will be hereinafter pointed out.

Mounted upon the outer end portion of the housing 8 is a brake supporting bracket 13 which comprises a hub portion 14 and oppositely extending arms 15, 16 on which the brakes are carried. The hub portion 14 is mounted on an anti-friction bearing 17 carried by the axle 5 as shown in Fig. 1, and is provided with a laterally extending sleeve 18 which telescopes upon the outer end portion of the housing 8, and is firmly secured thereto by the rivets which connect the housing 8 with the sleeve 9. These rivets serve to prevent movement of the sleeve 18 on the housing 8, but they are intended principally to hold said sleeve against endwise movement, as the torque strains are principally taken care of by other means provided for that purpose, and the use of rivets alone does not provide a sufficient margin of safety to eliminate danger of breakage. As best shown in Fig. 3, the sleeve 18 is provided with inwardly projecting segmental lugs 19, which form a clutch member adapted to interlock with the clutch member formed at the outer ends of the housing 8 and the sleeve 9 by the tenons 12, so that when the sleeve 18 is fitted upon the housing 8 in the manner shown in Fig. 1, the tenons 12 and lugs 19 interlock with each other and thereby prevent rotation of the sleeve 18 upon said housing 8. By this means the rivets above referred to are entirely relieved of the torque or braking strains, and need be strong enough only to prevent longitudinal movement of the sleeve 18 on the housing. The sleeve 9 reinforces the housing 8 at the points where strength is necessary, and makes it practicable to make the housing proper of lighter material. The internal brake is shown at 20 in Fig. 2, and the brake-operating shaft at 21 in Figs. 1 and 2. This shaft is supported by the arm 15 of the brake supporting bracket, the brake itself being supported by the arm 16 of said bracket in the usual way. The spring seats, the lower members 22 of which are shown in Fig. 1, are mounted upon the sleeve 18 as shown in said figure.

What I claim as my invention and desire to secure by Letters Patent, is—

1. The combination with an axle, of a housing through which said axle extends, and a brake-supporting bracket having interlocking engagement with said housing arranged to prevent relative rotation thereof.

2. The combination with an axle, of a housing through which said axle extends, a brake-supporting bracket having interlocking engagement with said housing arranged to prevent relative rotation thereof, and means for preventing relative endwise movement of said members.

3. The combination with an axle, of a housing through which said axle extends, and a brake-supporting bracket mounted upon said axle and having interlocking engagement with said housing arranged to prevent relative rotation thereof.

4. The combination with an axle, of a housing through which said axle extends, a brake-supporting bracket, an anti-friction bearing between said bracket and said axle, and interlocking means for non-rotatably securing said bracket to said housing.

5. The combination with an axle, of a housing through which said axle extends, a brake-supporting bracket telescopically engaging said housing, and interlocking means non-rotatably connecting said bracket with said housing.

6. The combination with an axle, of a housing through which said axle extends, a brake-supporting bracket telescopically engaging said housing, interlocking means non-rotatably connecting said bracket with said housing, and means for preventing relative endwise movement of said bracket and said housing.

7. The combination with an axle, of a housing through which said axle extends, a brake-supporting bracket mounted on said axle, and lugs carried by said bracket and engaging the outer end portion of said housing for non-rotatably securing said members together.

8. The combination with an axle, of a housing through which said axle extends, a brake-supporting bracket mounted on said axle, and lugs carried by said bracket and engaging the outer end portion of said housing for non-rotatably securing said members together, said bracket having a sleeve telescopically fitted upon said housing and riveted thereto.

9. The combination with an axle, of a housing through which said axle extends, a sleeve fitted in the outer end portion of said housing and secured thereto, and a brake-supporting bracket having interlocking engagement with said housing and sleeve arranged to prevent relative rotation thereof.

10. The combination with an axle, of a housing through which said axle extends, a sleeve fitted in the outer end portion of said housing and secured thereto, and a brake-supporting bracket having interlocking engagement with said housing and sleeve arranged to prevent relative rotation thereof, said bracket having a sleeve telescopically fitted upon said housing and secured thereto.

EDMUND C. MOGFORD.